(12) United States Patent
Butcher (10) Patent No.: US 12,463,584 B2
(45) Date of Patent: Nov. 4, 2025

(54) BALLASTED SUPPORT STRUCTURE AND HEADER FOR PHOTOVOLTAIC MODULES

(71) Applicant: Benjamin H. Butcher, Pequot Lakes, MN (US)

(72) Inventor: Benjamin H. Butcher, Pequot Lakes, MN (US)

(73) Assignee: Sunny Side Farm, Forest & Fabrication, Pequot Lakes, MN (US)

( * ) Notice: Subject to any disclaimer, the term of this patent is extended or adjusted under 35 U.S.C. 154(b) by 502 days.

(21) Appl. No.: 17/854,773

(22) Filed: Jun. 30, 2022

(65) Prior Publication Data

US 2023/0006602 A1  Jan. 5, 2023

Related U.S. Application Data

(60) Provisional application No. 63/217,923, filed on Jul. 2, 2021.

(51) Int. Cl.
*H02S 30/10* (2014.01)
*F24S 25/00* (2018.01)
(Continued)

(52) U.S. Cl.
CPC .............. *H02S 30/10* (2014.12); *H02S 20/10* (2014.12); *H02S 20/30* (2014.12);
(Continued)

(58) Field of Classification Search
CPC .. F24S 25/617; F24S 30/425; F24S 2025/017; F24S 2025/02; F24S 2030/115;
(Continued)

(56) References Cited

U.S. PATENT DOCUMENTS 5,125,608 A * 6/1992 McMaster ............... F24S 25/12
248/676
5,228,924 A * 7/1993 Barker ..................... H02S 20/30
136/246
(Continued)

FOREIGN PATENT DOCUMENTS

CN  202709529 U  *  1/2013

OTHER PUBLICATIONS

Machine Translation of CN 202709529 (Year: 2013).*

*Primary Examiner* — Steven B Mcallister
*Assistant Examiner* — Amy E Carter
(74) *Attorney, Agent, or Firm* — Christensen, Fonder, Dardi & Herbert PLLC; Andrew H. Auderieth; Douglas J. Christensen (57) ABSTRACT

A header for photovoltaic module support system and a photovoltaic module support system is disclosed. In various embodiments the header includes a beam and a plurality of strongback mounting tabs attached to the beam, each of the plurality of strongback mounting tabs attached to the beam such that the mounting tabs have an upward face that is mounted generally flush with an upward surface of the beam such that the upward face of the mounting tab and the upward surface of the beam define a support surface for an attachable strongback. In various embodiments the header includes a standoff and stabilizing rod attached to a downward surface of the beam, the stabilizing rod having a first end and second end attached to the downward surface of the beam with a main body that extends lengthwise with the beam and radially outward over the standoff.

20 Claims, 11 Drawing Sheets

(51) Int. Cl.
*F24S 25/617* (2018.01)
*F24S 30/00* (2018.01)
*F24S 30/425* (2018.01)
*H02S 20/10* (2014.01)
*H02S 20/30* (2014.01)

(52) U.S. Cl.
CPC ...... *F24S 2025/017* (2018.05); *F24S 2025/02* (2018.05); *F24S 25/617* (2018.05); *F24S 2030/115* (2018.05); *F24S 30/425* (2018.05)

(58) Field of Classification Search
CPC .......... F24S 25/13; H02S 30/10; H02S 20/10; H02S 20/301; Y02E 10/50
USPC ......................................... 126/600, 573, 572
See application file for complete search history.

(56) References Cited

U.S. PATENT DOCUMENTS

| | | | |
|---|---|---|---|
| 8,136,783 B2 | 3/2012 | Pietrzak | |
| 8,413,391 B2 | 4/2013 | Seery et al. | |
| 9,793,851 B2 * | 10/2017 | Sade | H02S 20/32 |
| 9,960,730 B2 | 5/2018 | Sinclair et al. | |
| 10,720,541 B2 | 7/2020 | Gerwing et al. | |
| 2011/0290306 A1 | 12/2011 | Roberts | |
| 2013/0340807 A1 * | 12/2013 | Gerwing | H02S 30/20 |
| | | | 136/246 |
| 2014/0069483 A1 * | 3/2014 | Wolter | F24S 25/70 |
| | | | 136/246 |
| 2015/0052834 A1 | 2/2015 | Gies et al. | |
| 2016/0344330 A1 * | 11/2016 | Gillis | H02S 20/32 |
| 2019/0199276 A1 | 6/2019 | Bailey et al. | |
| 2023/0006602 A1 | 1/2023 | Butcher | |

* cited by examiner

FIG. 6 the sun during peak daylight hours as opposed to being mounted flat on the ground. As such, in many instances it can be useful to rotate arrays of photovoltaic (PV) modules while they are attached to a mounting framework. For example, in many instances it is useful to rotate attached modules with the movement of the sun as the sun moves relative to the array over the course of a day.

BALLASTED SUPPORT STRUCTURE AND HEADER FOR PHOTOVOLTAIC MODULES

RELATED APPLICATIONS

The present application claims the benefit of U.S. Provisional Application 63/217,923, filed Jul. 2, 2021, the disclosure of which is incorporated by reference herein in its entirety.

FIELD OF THE DISCLOSURE

The present disclosure relates to photovoltaic arrays, and more specifically, to ballasted support structures for mounting photovoltaic panels.

BACKGROUND

Solar (e.g., photovoltaic) panels are often manufactured in the form of flat rigid structures. To facilitate their function of generating electricity and to improve performance, photovoltaic arrays are generally combined together and mounted on a framework that forms part of a fixed or pivotal support structure. The modules are electrically connected, in parallel or in series, to produce a combined power output that is connected to a voltage load such as one or more storage batteries. Often, it is desirable to mount solar panels outdoors at an angle from the horizontal so that they will more directly face the sun during peak daylight hours as opposed to being mounted flat on the ground. As such, in many instances it can be useful to rotate arrays of photovoltaic (PV) modules while they are attached to a mounting framework. For example, in many instances it is useful to rotate attached modules with the movement of the sun as the sun moves relative to the array over the course of a day.

However, providing a framework and mechanism capable of rotating multiple photovoltaic modules can be challenging. For example, such designs will require a design that can accommodate one or more actuators and appropriately controlling such actuators. Further, such designs will require a framework that is capable of supporting PV modules in a variety of rotational positions while also providing enough downward lift resistance to satisfy local codes or regulations on satisfying wind load resistance.

For example, U.S. Patent Application Publication No. 2019/0199276 to Bailey et al. describes a rotatable solar panel assembly including an elongated structural member extending along and parallel to a row of photovoltaic panels. Protrusions are coupled to the elongated structural member with an actuator and drive mechanisms coupled to the photovoltaic modules. Actuation of the actuator can move the elongated structural member, the movement of the elongated structural member can move the protrusions, the movement of the protrusions can move the drive mechanisms, and the movement of the drive mechanisms can rotate the photovoltaic modules. Additional disclosure includes U.S. Pat. Nos. 8,136,783; 8,413,391; 9,960,730; and 10,720,541; and U.S. Publications 2011/0290306; 2014/0069483; 2015/0052834; and 2019/0199276. These patents and publications are hereby incorporated by reference.

Improvements to existing solar module frameworks and/or techniques for rotating PV modules would be welcome.

SUMMARY

According to embodiments of the present disclosure a header for a ballasted support system for photovoltaic modules is disclosed. In various embodiments the support system includes a first A-frame and a second A-frame structure, the first and second A-frame structures each including a ground ballast. In various embodiments, the system includes a header spanning the first A-frame structure and the second A-frame structure. In one or more embodiments the header includes a beam and a plurality of strongback mounting tabs attached to the beam along a mounting tab portion of the beam, each of the plurality of strongback mounting tabs attached to the beam such that the mounting tabs have an upward face that is mounted generally flush with an upward surface of the beam such that the upward face of the mounting tab and the upward surface of the beam define a support surface for an attachable strongback.

In one or more embodiments the plurality of mounting tabs include a first strongback mounting tab and a second strongback mounting tab where the first and second mounting tab separated by a distance of approximately $3/16$ of a length of the mounting tab portion of the beam. In various embodiments the plurality includes a third strongback mounting tab where the third mounting tab is separated from the second mounting tab by a distance of approximately $10/16$ of the length of the mounting tab portion of the beam. In various embodiments the plurality includes a fourth strongback mounting tab, the fourth mounting tab separated from the third mounting tab by a distance of approximately $3/16$ of the length of the mounting tab portion of the beam. In certain embodiments a separation distance between the first and fourth mounting tabs defines the length of the mounting tab portion of the beam and wherein the second and third mounting tabs are attached to the beam between the first and fourth mounting tabs. In one or more embodiments, the system includes a standoff and stabilizing rod attached to a downward surface of the beam, the standoff positioned lengthwise between the second and third mounting tabs and extending radially from a lengthwise beam axis, the stabilizing rod having a first end and second end attached to the downward surface of the beam with a main body that extends lengthwise with the beam and radially outward over the standoff.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Referring to FIGS. 1A-1B and 2A-2C, a ballasted support system 100 for mounting photovoltaic modules 130 is depicted, according to one or more embodiments of the disclosure. In various embodiments the system 100 includes a plurality of A-frame side supports including a first A-frame structure 102 and a second A-frame structure 104. The first and second A-frame structures 102, 104 are each connected to a ground ballast 106 that provides uplift resistance for the support system 100 to secure the system to the ground. In one or more embodiments, the first and second A-frame structures 102, 104 have an A-frame shape with a pair of side arms 108 and one or more cross-beams 110. The side arms 108 are most separated at a bottom portion 112 of the structure 102, 104 where they are connected to the ground ballast 106 and are angled to come together to connect at a top portion 114 of the structure 102, 104.

In various embodiments, the first and second A-frame structures 102, 104 are established on the ground, oriented generally parallel to one another, and are separated by a gap 116. In one or more embodiments, the gap 116 is approximately 17-18 feet. However, the size of this gap 116 can vary and can be larger or smaller as desired for a scaled up or down embodiment. For example, in various embodiments, the size of the gap 116 will depend on the length of a header 118. In various embodiments, the system 100 includes the header 118 which has a first end 120 and a second end 122 and that spans the gap 116 between the first and second A-frame structures 102, 104. In various embodiments the header 118 is attached to the top portion 114 of each of the A-frame structures 102, 104. In various embodiments the header 118 is pivotally attached to the A-frame structures 102, 104 such that the header 118 is configured to rotate about a central lengthwise axis.

Figure 1A:
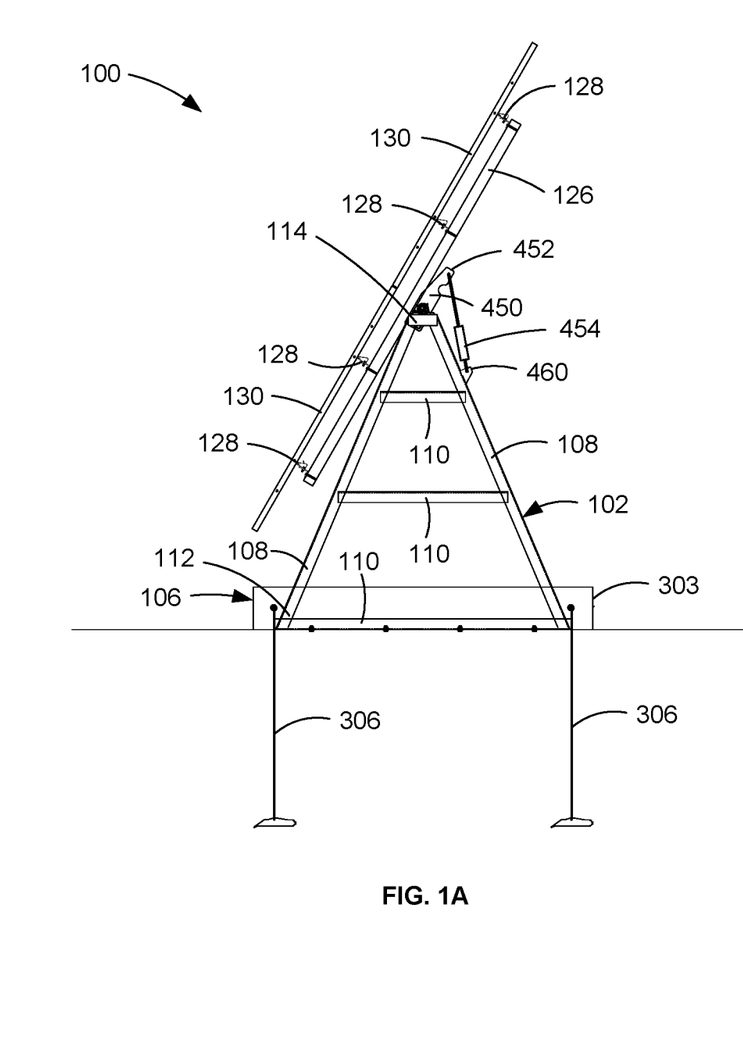
FIGS. 1A-1B depicts opposing side views of a ballasted support system for photovoltaic modules, according to one or more embodiments of the disclosure.
Figure 1B:
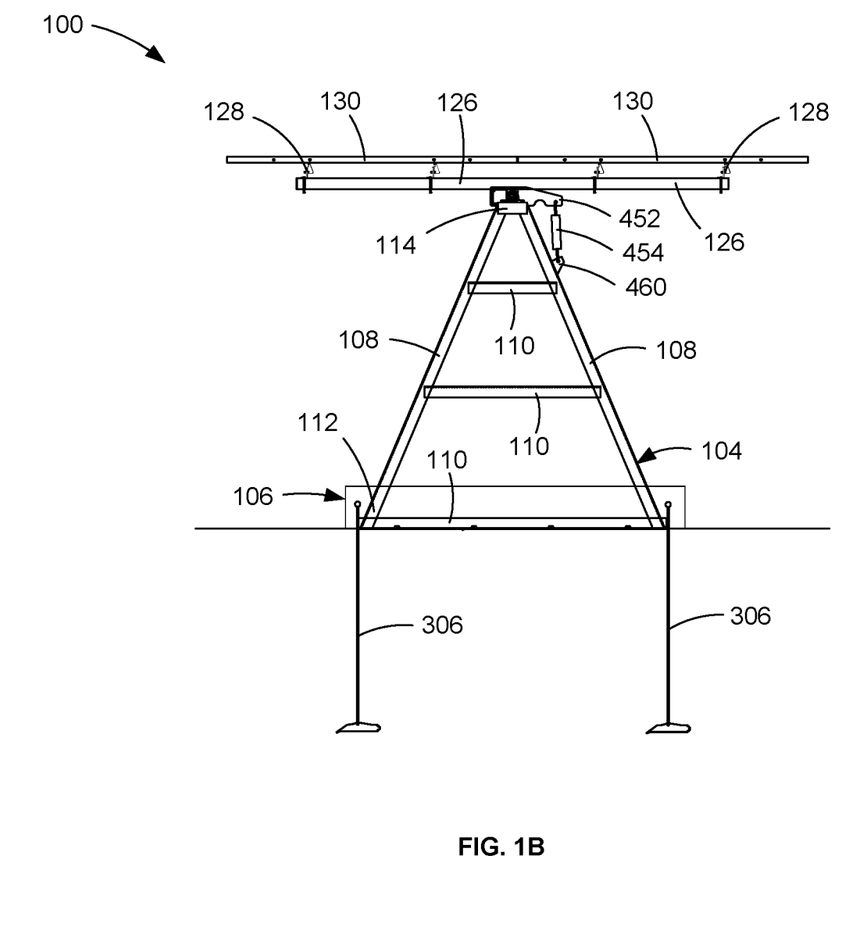
Figure 2A:
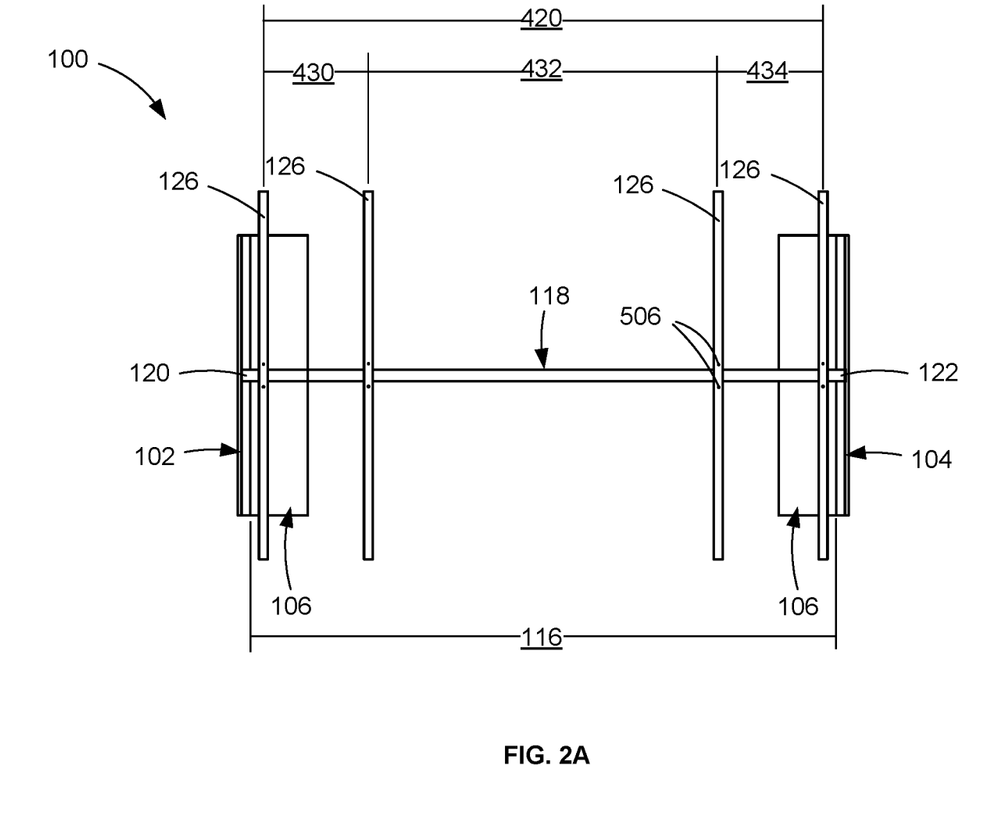
FIGS. 2A-2C depict top down views of a ballasted support system in stages of assembly, according to one or more embodiments of the disclosure.
Figure 2B:
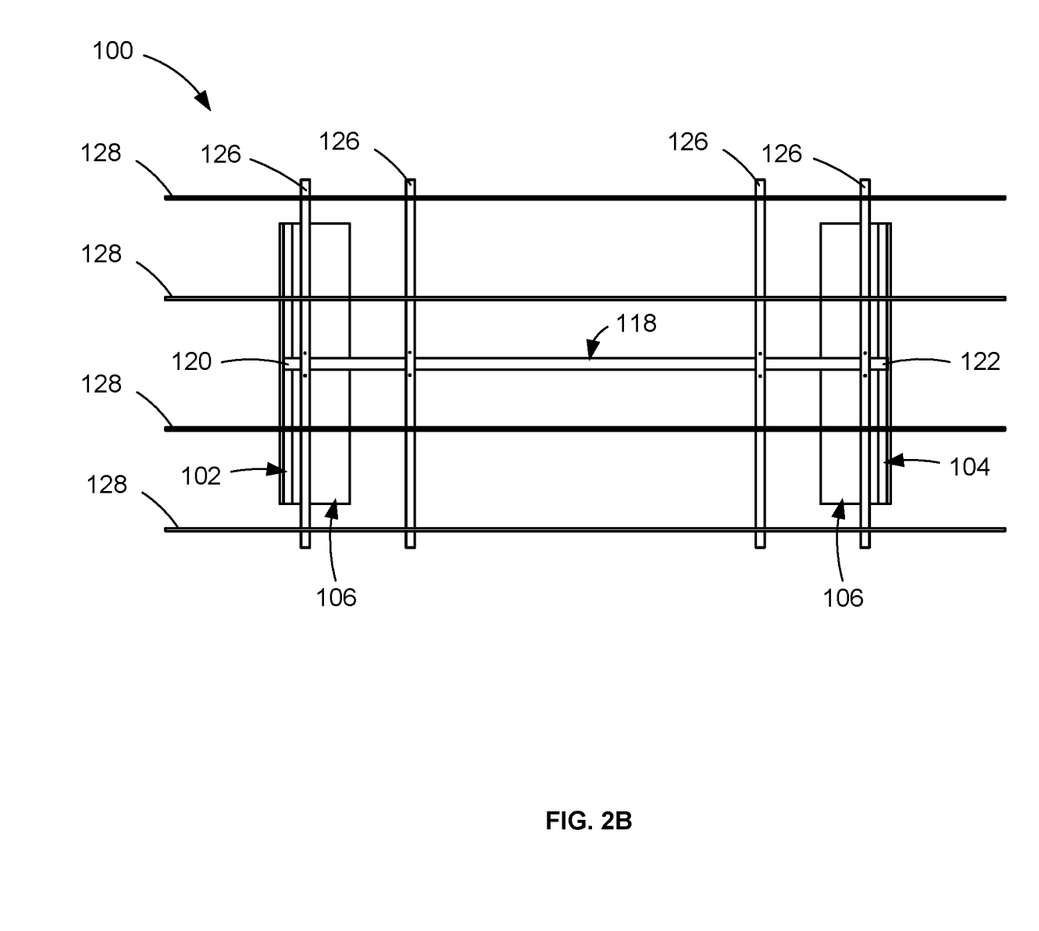
Figure 2C:
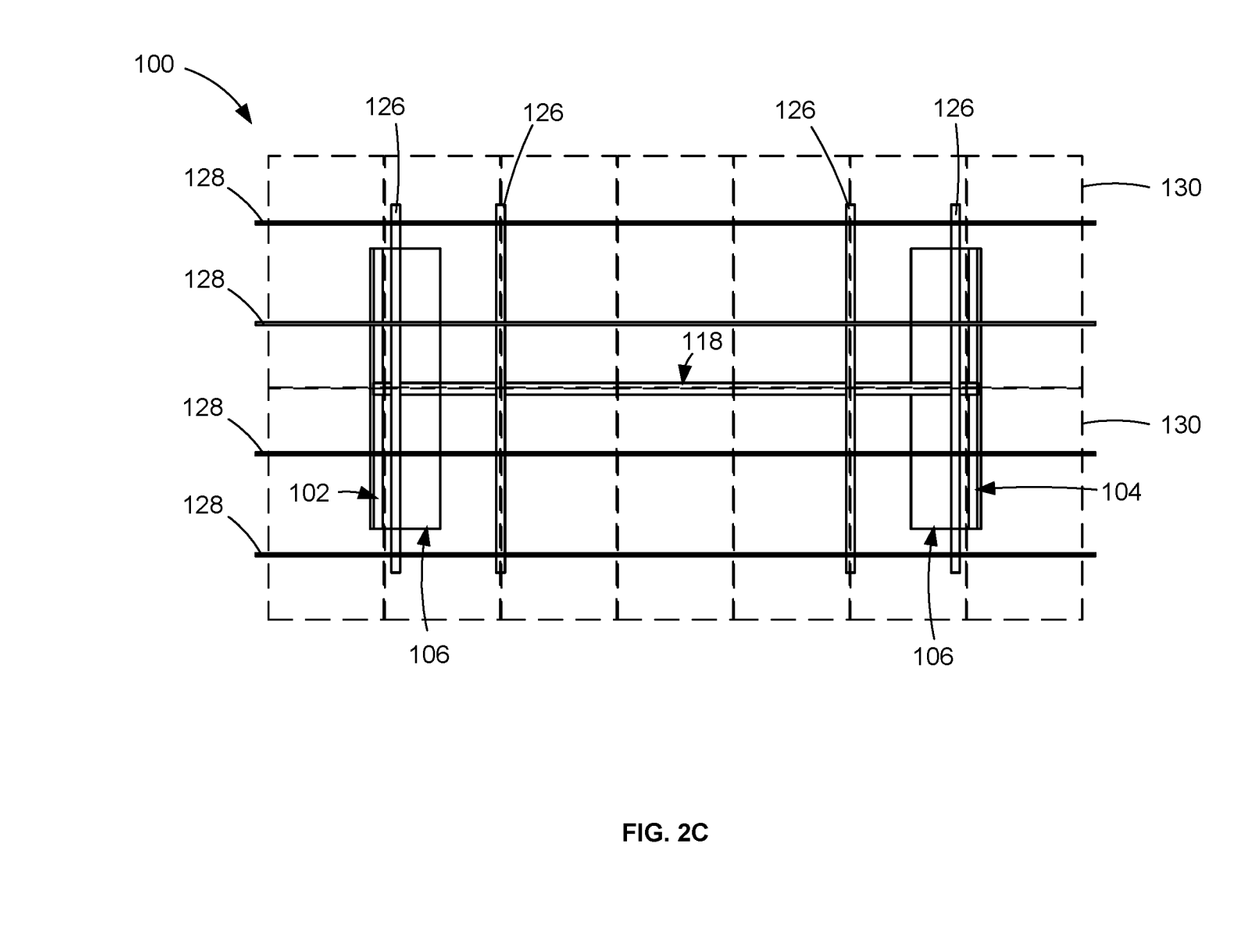

In such embodiments, the A-frame structures 102, 104, ground ballasts 106, and the attached header 118 define a base portion for mounting the remaining elements of the system 100. For example, as shown in FIGS. 1A-1B, and 2A-2C, in various embodiments a plurality of strongback beams 126 and/or mounting rails 128. In such embodiments each of the plurality of mounting rails 128 are extend across each of the plurality of strongback beams to define support elements extending parallel with the lengthwise axis of the header 118 for a plurality of photovoltaic modules. Depicted in FIGS. 2A-2C the ballasted support system 100 is shown in various stages of assembly. For example, in various embodiments, in various embodiments, FIG. 2A depicts the support system 100 without photovoltaic modules 130 and without mounting rails 128. FIGS. 2B and 2C depict the system as the mounting rails 128 and photovoltaic modules 130 are added onto the system 100. These views depict various embodiments of the disclosure along with aiding in viewing the various components of the system without certain components obstructing a top-down view.

The support system 100, as depicted herein, is supporting fourteen (14) photovoltaic modules 130 while using only four strongback beams 126 attached across the length of the header 118. Described further below, various embodiments of the disclosure provide a header 118 and an arrangement of strongback beams 126 that allow for a support system 100 that is ballasted, pivotable, and that also provides sufficient structural integrity to support a large number of modules 130. Such embodiments allow for a reduced number of strongback beams or other supports. For example the number of strongback beams to support the modules 130 can be reduced from five to four. As such, embodiments provide a pivotable support system that reduces cost and materials used, while also providing sufficient strength to support a full assortment of photovoltaic modules 130.

Figure 3A:
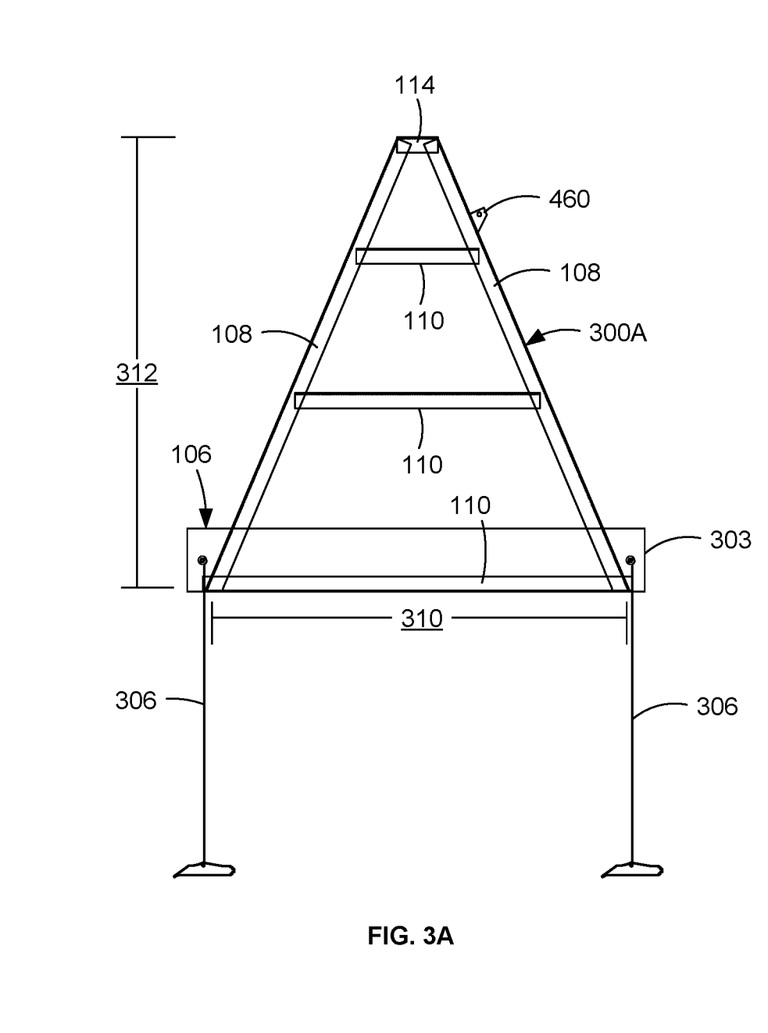
FIGS. 3A-3B depict embodiments of A-frame supports for a ballasted support system, according to one or more embodiments of the disclosure.
Figure 3B:
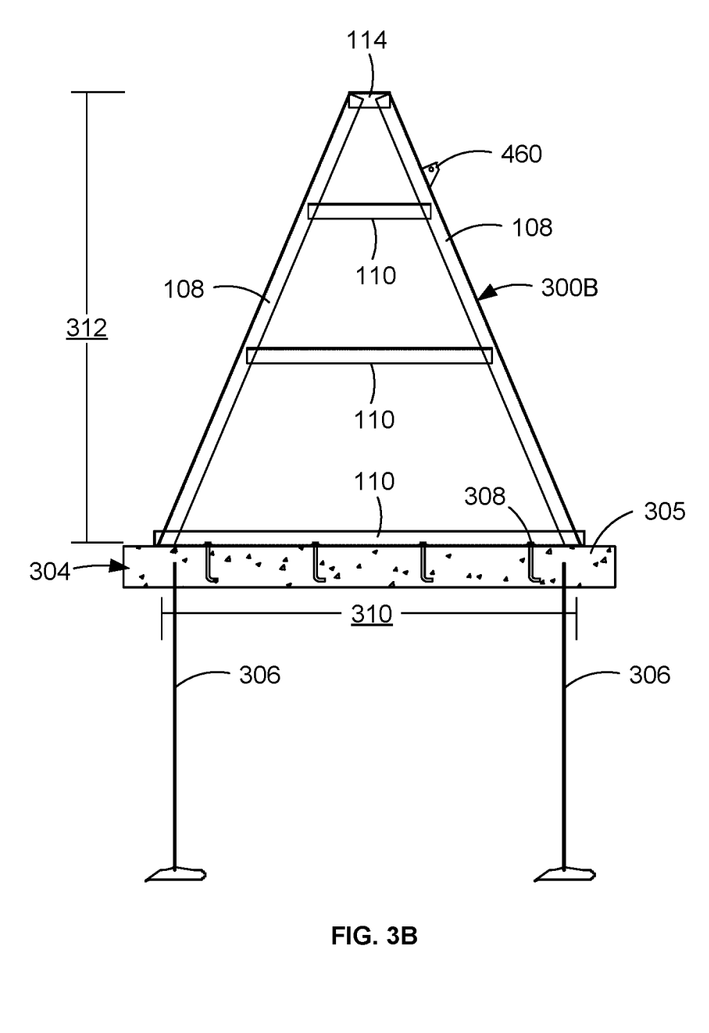

Referring to FIGS. 3A-3B, side views of A-frame structures 300A, 300B for a photovoltaic support system is depicted, according to one or more embodiments. In various embodiments, the A frame structures 300A, 300B are substantially similar as described above with reference to at least FIGS. 1A and 1B. As such, in various embodiments, the A-frame structures 300A, 300B include a pair of a pair of side arms 108 and one or more cross-beams 110 that extend between and connect the side arms 108 for structural support. To define an A-frame shape, the side arms 108 are most separated at a bottom portion 112 of the structure 102, and are angled towards one another to come together to connect at a top portion 114 of the structure 102, 104. In one or more embodiments, the side arms 108 are separated by a distance 310 at the bottom portion while the A-frame structure has a height 312. In various embodiments, the distance 310 is approximately seven (7) feet. In one or more embodiments the height 312 is approximately seven (7) to eight (8) feet. However, these values can be scaled up or down as desired to produce structures of various sizes. However, in some embodiments the ratio of the height 312 to the bottom width 310 can be maintained to achieve various sizes while reducing changes to the overall structural integrity of the design.

As described, in various embodiments the A-frame structures 300A, 300B are each connected to a ground ballast that provides uplift resistance. Referring to FIG. 3A, in various embodiments the A-frame structure includes a ground ballast 106 in the form of a basket 303. In such embodiments, basket 303 is loaded with material to weigh the basket down and provide desired uplift resistance. In such embodiments, the basket 303 can be loaded with as much or as little material as needed to satisfy uplift requirements of the ballast 106. For example, in one or more embodiments, the basket 303 is loaded with 1400 pounds of material. In one or more embodiments, in addition to the basket 303, one or more earth anchors 306 are attached to basket, thereby providing additional uplift resistance and tethering the ballast 106 and attached A-frame structure 300A to the earth. In one or more embodiments the anchors 306 are 5 ft anchors.

In various embodiments the anchors 306 are duckbill anchors. In various embodiments the anchors have a 3000 lbs uplift capacity.

Referring to FIG. 3B, in one or more embodiments the A-frame structure includes a ground ballast 304 in the form of a slab of concrete 305. In one or more embodiments the concrete slab 305 includes one or more horizontal rebar extending parallel with the cross beams 110. In various embodiments, the bottom most cross beam 110 includes a plurality of anchors 308 bolted to, welded to, or otherwise attached to the bottom cross-beam 110 and connecting the A-frame structure to the ballast. In various embodiments the concrete slab 305 has a size that corresponds to the desired uplift capacity of the ballast 304. For example, where more uplift capacity is required a larger slab can be poured while where conversely a smaller slab can be poured where a lower uplift capacity is required. In various embodiments, the concrete ballast is approximately 1400 lbs. In one or more embodiments, the earth anchors 306 are attached to the slab 305 via a cable that is looped around the horizontal rebar in the concrete ballast. In various embodiments the ground ballast for each A-frame structure provides at least 7400 lbs uplift resistance.

Figure 4A:
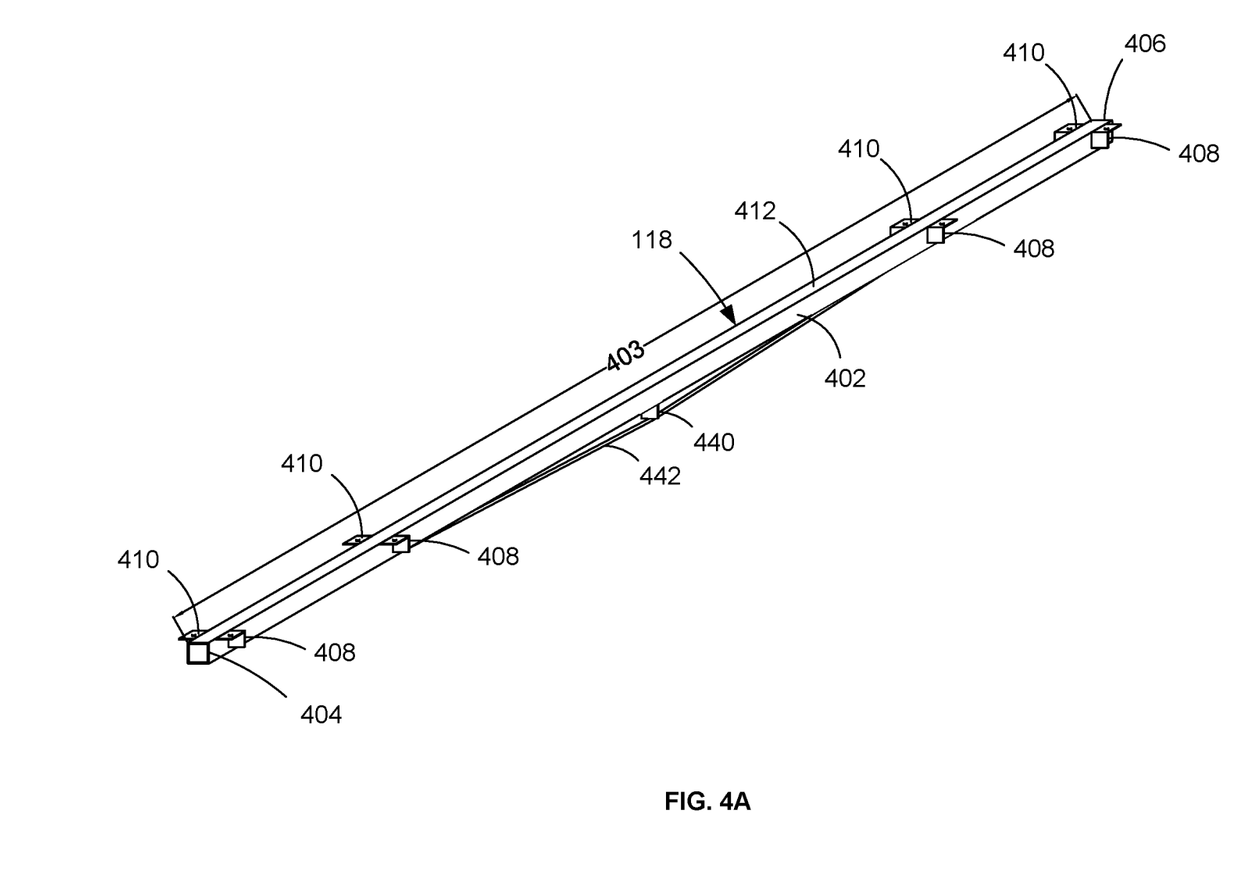
FIG. 4A depicts a perspective view of a header for a ballasted support system, according to one or more embodiments of the disclosure.
Figure 4B:
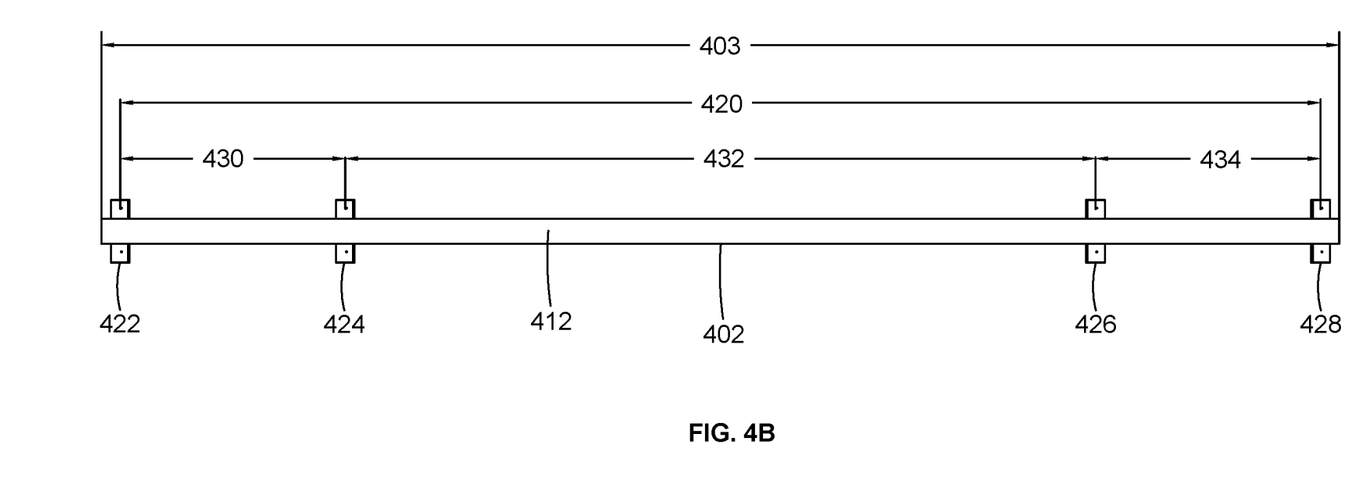
FIGS. 4B-4C depict a top view and a side view of the header for a ballasted support system, according to one or more embodiments of the disclosure.
Figure 4C:
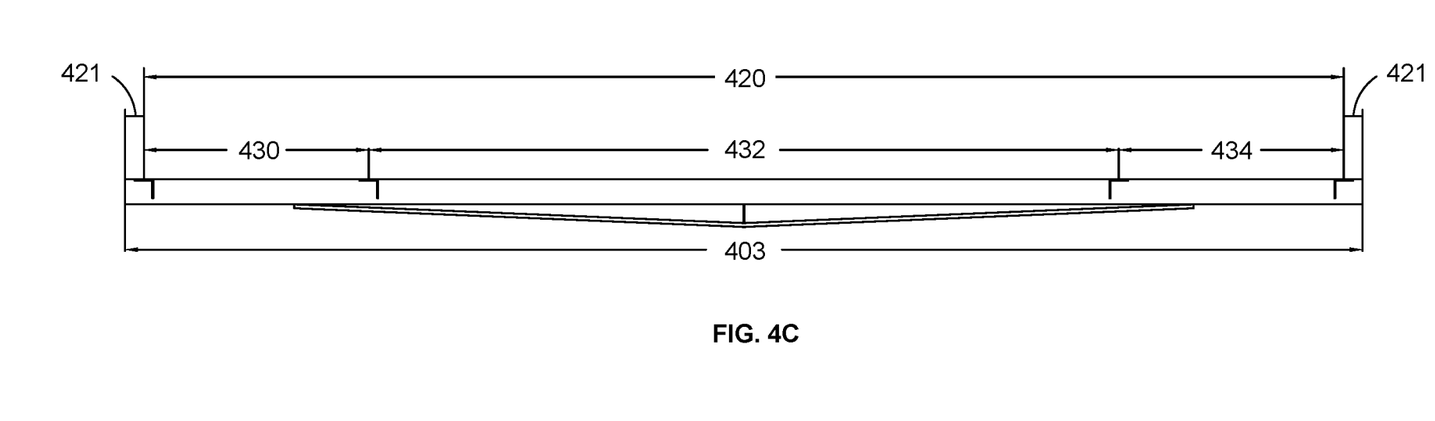

Referring to FIGS. 4A-4C, a header 118 for photovoltaic module support system and a photovoltaic module support system is depicted, according to one or more embodiments. In various embodiments, the header 118 includes a metal beam 402 extending a lengthwise distance 403 from a first end 404 to a second end 406 and a plurality of strongback mounting tabs 408 that are attached to the beam 402. In various embodiments each of the plurality of strongback mounting tabs 408 are attached to the beam 402 such that the mounting tabs 408 have an upward face 410 that is mounted generally flush with an upward surface 412 of the beam 402 such that the upward face 410 of the mounting tab and the upward surface of the beam 402 define a support surface 414 for an attachable strongback beam. In various embodiments the strongback mounting tabs 408 each include a pair of tabs 408 that are positioned on opposing sides of the beam 402. In various embodiments the support surfaces 414 defined by the tabs 408 extend perpendicular to the lengthwise axis of the beam 402—across the upward surface 410 of pair of tabs 408 and the top surface 412 of the beam 402.

In various embodiments, the mounting tabs define a mounting tab portion 420 of the beam 402 that is a sub-portion of the length 403 of the beam 420 that includes all of the plurality of mounting tabs 408. For example, in certain embodiments the beam length 403 could be substantially longer than the mounting tab portion 420, such as extending across multiple sets of A-frames that share one large header. In certain embodiments, such as depicted in FIGS. 4A-4C, the beam length 403 has a mounting sections 421 that extends out slightly longer than the mounting tab portion 420. In such embodiments the mounting section 421 provides a portion of the beam that can be mounted onto the A-frame section. However, in various embodiments the mounting tab portion 420 could be the same as the beam length 403.

In one or more embodiments, the mounting tabs 408 include four pairs of tabs including a first strongback mounting tab 422, a second strongback mounting tab 424, a third mounting tab 426, and a fourth mounting tab 428. In various embodiments the first and second mounting tabs are separated by a distance 430 of approximately 3/16 of a length of the mounting tab portion 420 of the beam. In one or more embodiments the second and third strongback mounting tab are separated by a distance 432 of approximately 10/16 of the length of the mounting tab portion 420. In various embodiments the fourth strongback mounting tab is separated from the third mounting tab by a distance 434 of approximately 3/16 of the length of the mounting tab portion 420. In one or more embodiments the separation distance between the first and fourth mounting tabs defines the length of the mounting tab portion 420 and the second and third mounting tabs are attached to the beam between the first and fourth mounting tabs.

In one or more embodiments, the header 118 additional includes a standoff 440 and stabilizing rod 442 attached to a downward surface of the beam 420. In various embodiments the standoff 440 is positioned lengthwise between the second and third mounting tabs and extending radially from a lengthwise beam axis. In various embodiments the stabilizing rod 442 has a first end and second end attached to the downward surface of the beam with a main body that extends lengthwise with the beam and radially outward over the standoff 440. In such embodiments, the stabilizing rod 442 provides additional structural support for the header beam 402 to resist flexing or bending, particularly near the middle portion of the beam 420.

Figure 4D:
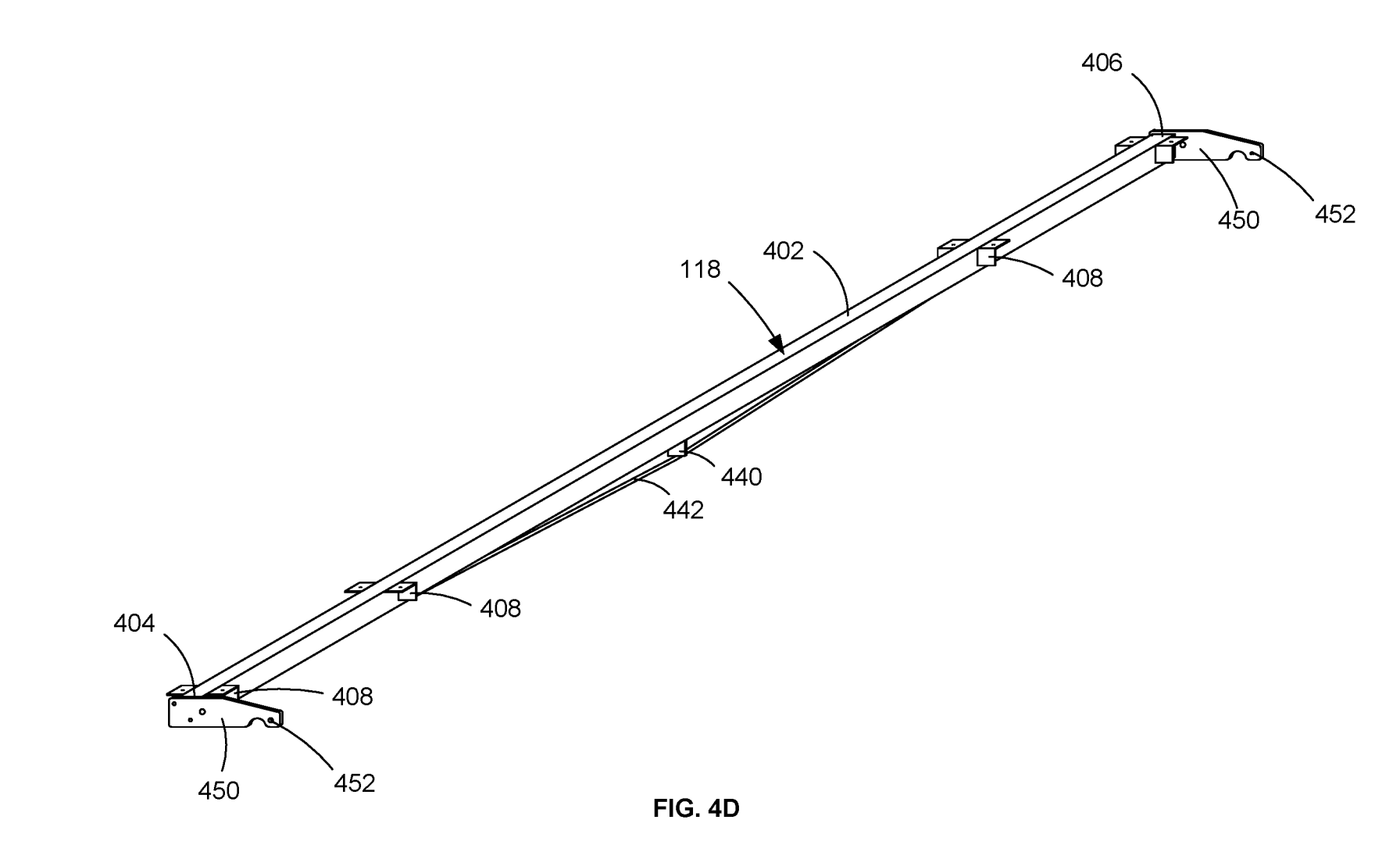
FIG. 4D depicts a perspective view of a header with a swingarm for a ballasted support system, according to one or more embodiments of the disclosure.

Referring to FIG. 4D, in various embodiments, a swing arm 450 attached to one or more of the first end 404 and second end 406. Referring additionally to FIGS. 1A and 1B, the swing arm 450 includes an attachment point 452 for connection to an actuator 454. In various embodiments the one or more of the first A-frame structure and the second A-frame structure includes a corresponding actuator mount 460 for connection to the actuator 454. As depicted in FIGS. 1A and 1B, the header 118 is rotatably mounted to the A-frame structures and the actuator 454 is configured to rotate the header 118 and attached elements by actuating the swingarm 450. For example, in various embodiments, the header and attached panels are rotatable between a first position depicted in FIG. 1A and a second position depicted in 1B. In one or more embodiments, the actuator mount 460 is positioned on one of the two A-frame structures. In certain embodiments, the other A-frame structure includes shock absorber padding or other stabilizing padding to stabilize the header during wind events, tilt adjustments, or other events that cause movement on the panels.

Figure 5A:
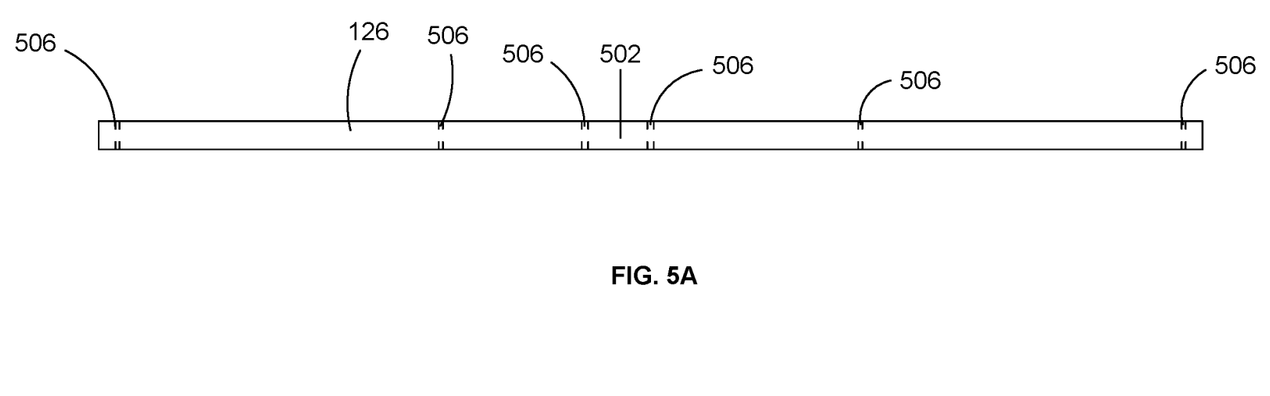
FIG. 5A depicts a side view of a strongback for a ballasted support system, according to one or more embodiments of the disclosure.
Figure 5B:
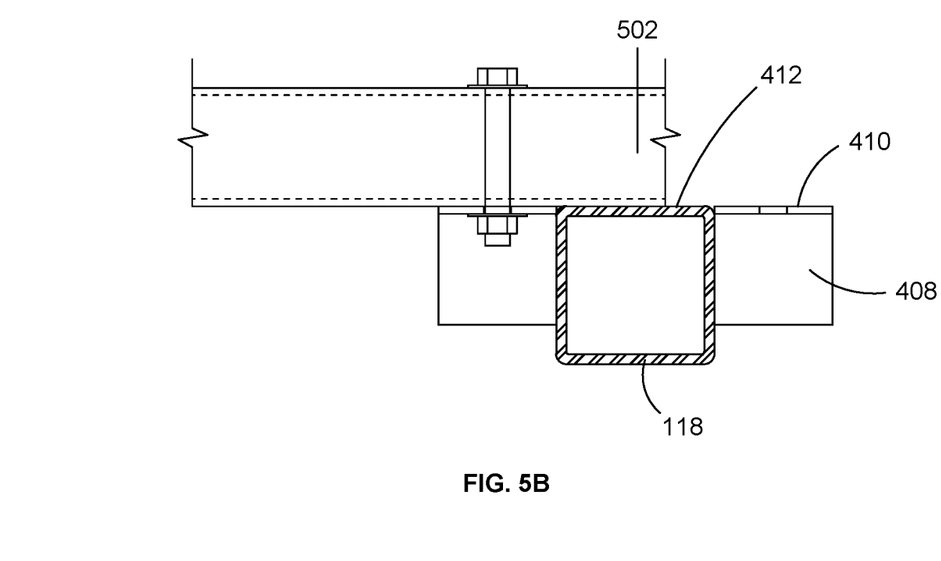
FIG. 5B depicts a partial cross-sectional view of a header and an attached strongback, according to one or more embodiments of the disclosure.

Referring additionally to FIGS. 5A-5B and to FIG. 2A, in various embodiments, the beam 402 is a 4×4 inch steel beam and the standoff 440 is a 3×3×¼ inch steel piece of material. In one or more embodiments the strongback beams 126 are attached to the header 118 via the support surfaces provided by the plurality of mounting tabs. For example, in various embodiments each of the plurality of strongback beams 126 are attached to one of the plurality of mounting tabs 408 at approximately a center of mass 502 of the strongback beam 126. For example, in various embodiments the strongback beam 126 includes a plurality of mounting holes 506 for securing the beam 126 to the header 118. In such embodiments the plurality of strongback beams 126 are attached to the header 118 via the support surfaces provided by the plurality of mounting tabs, wherein each of the plurality of strongback beams are attached to one of the plurality of mounting tabs at approximately a center of mass 502 of the strongback beam. In such embodiments the beams can be bolted, welded, or otherwise attached to the header 118.

Figure 6:
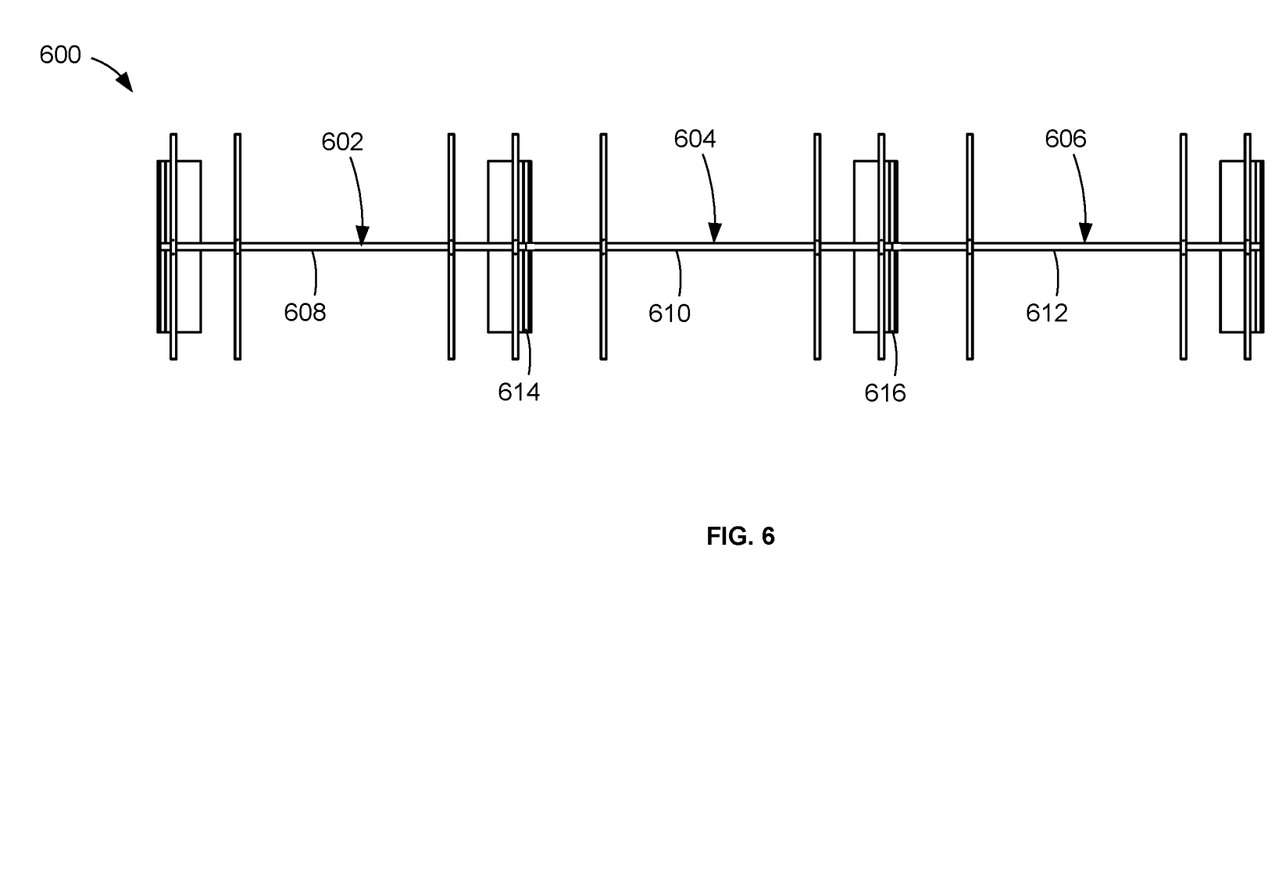
FIG. 6 depicts a multi-unit ballasted support system, according to one or more embodiments of the disclosure.

Referring to FIG. 6, in various embodiments, the support system can be configured as a multi-unit system 600. Depicted in FIG. 6 the system 600 includes a first unit 602, a second unit 604, and a third unit 606, where each unit is defined by a distinct header. For example, a first header 608, a second header 610, and a third header 612. In one or more embodiments the headers of adjacent units are configured to share the A-frame support. For example, the first and second header 608, 610 share a first A-frame support 614 and the second header 610 and third header 612 share a second A-frame support 616. In this manner, multiple units can be cascaded together to scale up the number of panels that can be supported. Further, in various embodiments, because each of the headers are distinct units in various embodiments each header can be individually actuated to pivot each unit of panels individually.

As used herein the term approximately means that a value has a margin for error in a range of ±10%, for example to accommodate for manufacturing tolerances and the like.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein. In addition, further disclosure regarding various embodiments can be found in the attached diagrams and disclosure found in appendix A, submitted with this application. Appendix A is incorporated by reference herein for all purposes.

What is claimed is:

1. A ballasted support system for photovoltaic modules, the system comprising:
   a first A-frame and a second A-frame structure, the first and second A-frame structures each including a ground ballast, each of the first A-frame and the second A-frame being approximately the same height and configured to be positioned along an axis extending in an East-West direction;
   a header spanning the first A-frame structure and the second A-frame structure, wherein the header comprises:
      a beam;
      a plurality of strongback mounting tabs attached to the beam along a mounting tab portion of the beam, each of the plurality of strongback mounting tabs attached to the beam such that the mounting tabs have an upward face that is mounted generally flush with an upward surface of the beam such that the upward face of the mounting tab and the upward surface of the beam define a support surface for an attachable strongback, the plurality of mounting tabs including:
         a first strongback mounting tab and a second strongback mounting tab, the first and second mounting tab separated by a distance of approximately 3/16 of a length of the mounting tab portion of the beam;
         a third strongback mounting tab, the third mounting tab separated from the second mounting tab by a distance of approximately 10/16 of the length of the mounting tab portion of the beam; and
         a fourth strongback mounting tab, the fourth mounting tab separated from the third mounting tab by a distance of approximately 3/16 of the length of the mounting tab portion of the beam;
      wherein a separation distance between the first and fourth mounting tabs defines the length of the mounting tab portion of the beam and wherein the second and third mounting tabs are attached to the beam between the first and fourth mounting tabs; and
   a standoff and stabilizing rod attached to a downward surface of the beam, the standoff positioned lengthwise between the second and third mounting tabs and extending radially from a lengthwise beam axis, the stabilizing rod having a first end and second end, each of the first and second ends being attached to the downward surface of the beam with a main body that extends lengthwise with the beam and radially outward over the standoff.

2. The ballasted support system of claim 1, wherein the header has a first end and a second end and is rotatably mounted to the first A-frame and second A-frame structure, and wherein a swingarm is attached to one or more of the first and end the second end, the swing arm including an attachment point for connection to an actuator and wherein one or more of the first A-frame structure and the second A-frame structure includes a corresponding actuator mount for connection to the actuator.

3. The ballasted support system of claim 2, further comprising an actuator connected to the attachment point and the corresponding actuator mount, wherein the actuator is configured to rotate the header by actuating the swingarm.

4. The ballasted support system of claim 1, further comprising a plurality of strongback beams attached to the header via the support surfaces provided by the plurality of mounting tabs, wherein each of the plurality of strongback beams are attached to one of the plurality of mounting tabs at approximately a center of mass of the strongback beam.

5. The ballasted support system of claim 4, wherein the plurality of mounting tabs includes only the first, second, third, and fourth mounting tabs an wherein the plurality of strongback beams includes only four strongback beams.

6. The ballasted support system of claim 4, further comprising a plurality of mounting rails, each of the plurality of mounting rails extending along the lengthwise beam axis across each of the plurality of strongback beams to define support elements for a plurality of photovoltaic modules.

7. The ballasted support system of claim 5, further being configured to support fourteen photovoltaic modules mounted to the support system.

8. The ballasted support system of claim 1, wherein the beam is a 4×4¼ inch beam.

9. The ballasted support system of claim 1, wherein the beam is composed of ¼ inch thick piece of steel.

10. The ballasted support system of claim 1, wherein the standoff is a 3×3¼ inch piece of material.

11. The ballasted support system of claim 1, wherein the ground ballast is a basket for holding ballast weight material.

12. The ballasted support system of claim 1, wherein the ground ballast is a piece of concrete.

13. The ballasted support system of claim 12, wherein the ballast includes a plurality of rebar.

14. The ballasted support system of claim 1, wherein the ground ballast includes one or more earth anchors.

15. The ballasted support system of claim 14, wherein each of the one or more earth anchors has at least a 3000 lbs uplift capacity and wherein the ground ballast has at least a 1400 lbs uplift capacity.

16. The ballasted support system of claim 1, further comprising a third A-frame structure, wherein the header spans the first, second, and third A-frame structure.

17. The ballasted support system of claim 16, further comprising a second plurality of strongback mounting tabs attached to the beam along a second mounting tab portion of the beam, wherein the mounting tab portion of the beam is situated between the first and second A-frame structures and the second mounting tab portion situated between the second and third A-frame structures.

18. A header for photovoltaic module support system, the header comprising:
  a beam;
  a plurality of strongback mounting tabs attached to the beam along a mounting tab portion of the beam, each of the plurality of strongback mounting tabs attached to the beam such that the mounting tabs have an upward face that is mounted generally flush with an upward surface of the beam such that the upward face of the mounting tab and the upward surface of the beam define a support surface for an attachable strongback, the plurality of mounting tabs including:
    a first strong back mounting tab; a second strongback mounting tab, the first and second mounting tab separated by a distance of approximately 3/16 of a length of the mounting tab portion of the beam;
    a third strongback mounting tab, the third mounting tab separated from the second mounting tab by a distance of approximately 10/16 of the length of the mounting tab portion of the beam; and
    a fourth strongback mounting tab, the fourth mounting tab separated from the third mounting tab by a distance of approximately 3/16 of the length of the mounting tab portion of the beam; wherein a separation distance between the first and fourth mounting tabs defines the length of the mounting tab portion of the beam and wherein the second and third mounting tabs are attached to the beam between the first and fourth mounting tabs; and
  a standoff and stabilizing rod attached to a downward surface of the beam, the standoff positioned lengthwise between the second and third mounting tabs and extending radially from a lengthwise beam axis, wherein the stabilizing rod is an angled rod having a first end and second end, each of the first and second ends being attached to the downward surface of the beam and having a main body that extends lengthwise with the beam and radially outward over the standoff and is attached to the standoff between the first end and the second end.

19. The header of claim 18, wherein the plurality of mounting tabs includes only the first, second, third, and fourth mounting tabs such that the header is attachable with only four strongback beams.

20. A ballasted rotatable photovoltaic power system comprising:
  a first A-frame and a second A-frame structure, the first and second A-frame structures each including a ground ballast;
  a header having a first end and a second end and rotatably mounted to the first A-frame structure and the second A-frame structure, wherein the header comprises:
    a beam;
    a plurality of strongback mounting tabs attached to the beam along a mounting tab portion of the beam, each of the plurality of strongback mounting tabs attached to the beam such that the mounting tabs have an upward face that is mounted generally flush with an upward surface of the beam such that the upward face of the mounting tab and the upward surface of the beam define a support surface for an attachable strongback, the plurality of mounting tabs including:
      a first strongback mounting tab and a second strongback mounting tab, the first and second mounting tab separated by a distance of approximately 3/16 of a length of the mounting tab portion of the beam;
      a third strongback mounting tab, the third mounting tab separated from the second mounting tab by a distance of approximately 3/16 of the length of the mounting tab portion of the beam; and a fourth strongback mounting tab, the fourth mounting tab separated from the third mounting tab by a distance of approximately 3/16 of the length of the mounting tab portion of the beam;
      wherein a separation distance between the first and fourth mounting tabs defines the length of the mounting tab portion of the beam and wherein the second and third mounting tabs are attached to the beam between the first and fourth mounting tabs;
    a standoff and stabilizing rod attached to a downward surface of the beam, the standoff positioned lengthwise between the second and third mounting tabs and extending radially from a lengthwise beam axis, the stabilizing rod having a first end and second end, each of the first and second ends being attached to the downward surface of the beam with a main body that extends lengthwise with the beam and radially outward over the standoff; and
    a swingarm attached to one or more of the first and end the second end, the swing arm including an attachment point for connection to an actuator and wherein one or more of the first A-frame structure and the second A-frame structure includes a corresponding actuator mount for connection to the actuator and wherein the actuator is configured to rotate the header by actuating the swingarm;
  a plurality of strongback beams attached to the header via the support surfaces provided by the plurality of mounting tabs, wherein each of the plurality of strongback beams are attached to one of the plurality of mounting tabs at approximately a center of mass of the strongback beam;
  a plurality of mounting rails, each of the plurality of mounting rails extending along the lengthwise beam axis across each of the plurality of strongback beams to define support elements for a plurality of photovoltaic modules; and
  at least fourteen photovoltaic modules mounted to the plurality of mounting rails;
  wherein the plurality of mounting tabs includes only the first, second, third, and fourth mounting tabs and wherein the plurality of strongback beams includes only four strongback beams; and
  wherein the ground ballast for each A-frame structure provides at least 7400 lbs uplift resistance.

* * * * *